United States Patent [19]

Snavely, Jr. et al.

[11] Patent Number: 4,649,032

[45] Date of Patent: * Mar. 10, 1987

[54] PROCESS FOR THE SELECTIVE REMOVAL OF HYDROGEN SULFIDE FROM GASEOUS STREAMS

[75] Inventors: Earl S. Snavely, Jr., Arlington; Timothy A. Jones, Carrollton, both of Tex.

[73] Assignee: Mobil Oil Corporation, New York, N.Y.

[*] Notice: The portion of the term of this patent subsequent to Feb. 12, 2002 has been disclaimed.

[21] Appl. No.: 690,545

[22] Filed: Jan. 11, 1985

Related U.S. Application Data

[63] Continuation-in-part of Ser. No. 361,947, Mar. 25, 1982, abandoned, which is a continuation-in-part of Ser. No. 336,796, Jan. 4, 1982, abandoned.

[51] Int. Cl.$^4$ .............................................. C01B 17/16
[52] U.S. Cl. ..................... 423/226; 423/220; 423/224; 423/229; 423/232; 423/234; 423/575; 423/573 R
[58] Field of Search .................. 423/224, 226, 573 R, 423/575, 220, 229, 232, 234

[56] References Cited

U.S. PATENT DOCUMENTS

| | | | |
|---|---|---|---|
| 2,747,962 | 5/1956 | Heitz et al. | 423/226 |
| 3,071,433 | 1/1964 | Dunn | 423/224 |
| 3,077,488 | 2/1963 | Mercier et al. | 260/439 |
| 3,226,320 | 12/1965 | Meuly et al. | 423/206 |
| 3,491,880 | 1/1970 | Reck | 209/164 |
| 3,580,950 | 5/1971 | Bersworth | 260/534 |
| 3,642,431 | 2/1972 | Suzuki et al. | 423/226 |
| 3,642,448 | 2/1972 | Beavon | 423/573 |
| 3,647,069 | 3/1972 | Bailey | 210/44 |
| 3,752,877 | 8/1973 | Beavon | 423/573 |
| 3,933,993 | 1/1976 | Salemme | 423/226 |
| 3,959,452 | 5/1976 | Espenscheid et al. | 423/573 G |
| 3,993,563 | 11/1976 | Degner | 210/221 M |
| 4,009,251 | 2/1977 | Meuly | 423/573 |
| 4,036,942 | 7/1977 | Sibeud et al. | 423/573 |
| 4,085,192 | 4/1978 | Van Scoy | 423/226 |
| 4,118,467 | 10/1978 | Sano et al. | 423/573 R |
| 4,125,597 | 11/1978 | Fleck | 423/573 |
| 4,234,560 | 11/1980 | Kuerter et al. | 423/551 |
| 4,309,285 | 1/1982 | Gallaher, Sr. | 210/123 |
| 4,388,293 | 6/1983 | Diaz | 423/573 R |
| 4,400,368 | 8/1983 | Diaz | 423/226 |
| 4,402,930 | 9/1983 | Diaz | 423/224 |
| 4,414,194 | 11/1983 | Blytas | 423/224 |
| 4,499,059 | 2/1985 | Jones et al. | 423/224 |

FOREIGN PATENT DOCUMENTS 448270 of 0000 United Kingdom .

OTHER PUBLICATIONS

Arthur L. Kohl, Fred C. Riesenfeld, Gas Purification 3rd Ed. Gulf Publishing Company, Houston 1979 pp. 113–135.
A. J. Moyes and J. S. Wilkinson, "Development of the Holmes-Stretford Process" Feb. 1974, pp. 84–90, The Chemical Engineer.
R. W. Hohlfeld, "Selective Absorption of H$_2$S from Sour Gas", Apr. 18–20, 1979, Dow Chem. Co., Soc. of Pet. Engs. of AIME, SPE 7972.
Ronald W. Hohlfeld, "New H$_2$S Scrubber Cleans Small or Large Gas Streams", Oct. 15, 1979, pp. 129, 130, Oil and Gas Journal.

Primary Examiner—John Doll
Assistant Examiner—Jackson Leeds
Attorney, Agent, or Firm—Alexander J. McKillop; Michael G. Gilman; Charles J. Speciale

[57] ABSTRACT

The invention relates to a process for the selective removal of hydrogen sulfide from a gaseous stream additionally containing carbon dioxide by contacting the gaseous stream with a polyvalent metal chelate solution for a time sufficient to allow the polyvalent metal chelate to oxidize the hydrogen sulfide to elemental sulfur without allowing the polyvalent metal chelate solution to absorb appreciable amounts of carbon dioxide. The pH of the metal chelate solution should be greater than 7 and the contact time between the polyvalent metal chelate and the gaseous stream is between 0.006 and 0.08 second.

61 Claims, 10 Drawing Figures

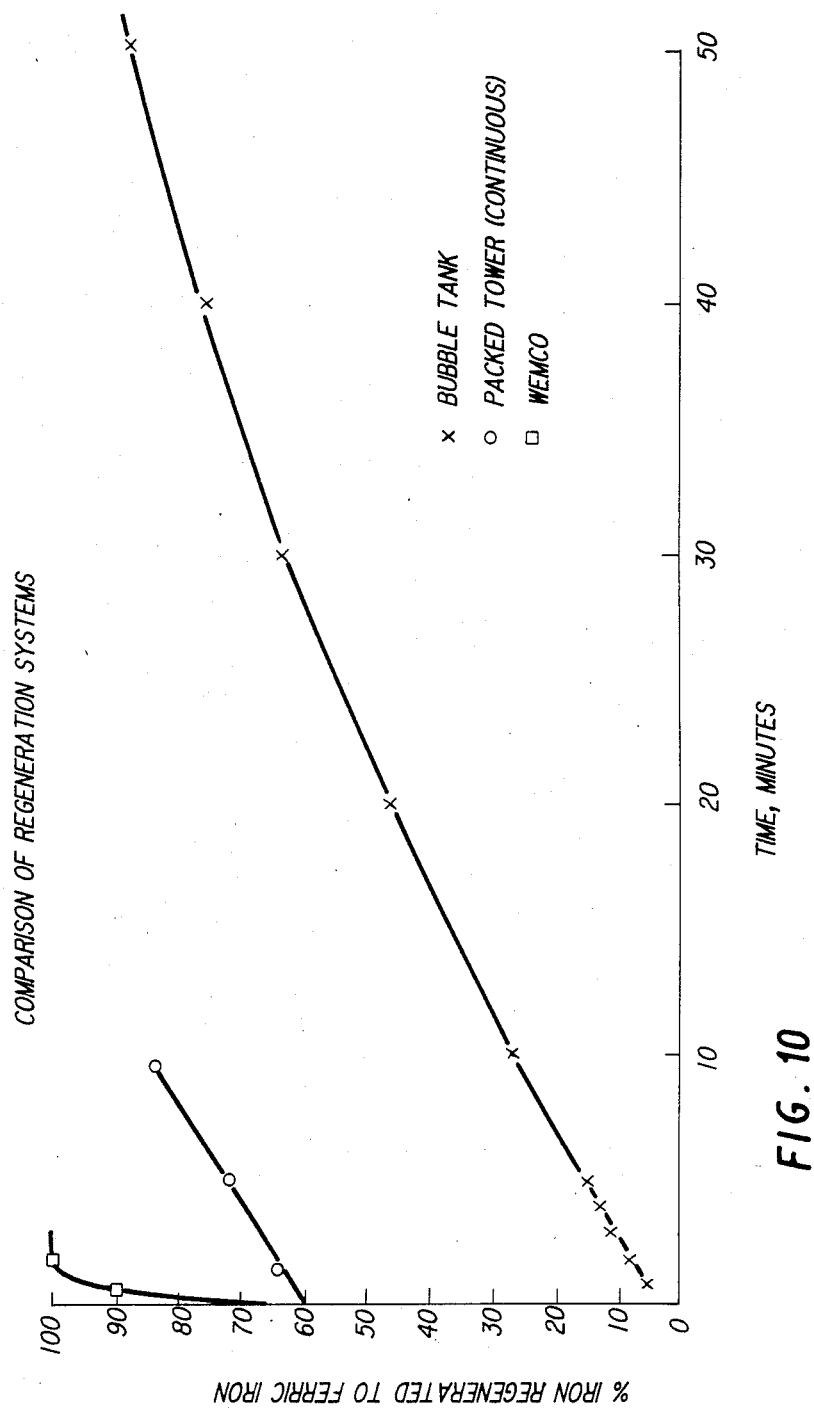

PROCESS FOR THE SELECTIVE REMOVAL OF HYDROGEN SULFIDE FROM GASEOUS STREAMS

CROSS-REFERENCE TO RELATED APPLICATIONS

This application is a continuation-in-part of U.S. Ser. No. 361,947, filed Mar. 25, 1982, now abandoned which in turn is a continuation-in-part of U.S. Ser. No. 336,796, filed Jan. 4, 1982, now abandoned the entire contents of which are hereby incorporated.

BACKGROUND OF THE INVENTION

1. Field of the Invention

The present invention relates to a process for the selective removal of hydrogen sulfide from gaseous streams, additionally containing carbon dioxide. More particularly, the present invention provides a process for selectively removing of hydrogen sulfide from gaseous streams containing hydrogen sulfide, even minor amounts of hydrogen sulfide, by oxidizing the hydrogen sulfide with a polyvalent metal chelate solution to form elemental sulfur. Additionally, the invention relates to the use of a particular type of aeration flotation apparatus to recover the formed sulfur particles from the metal chelate solution and to regenerate (oxidize) the reduced metal chelate.

2. Description of the Prior Art

The removal of hydrogen sulfide from gaseous streams, such as the waste gases liberated in the course of various chemical and industrial processes, for example, in the pulping of wood, natural gas and crude oil production and in petroleum refining, has become increasingly important in combating atmospheric pollution. Hydrogen sulfide-containing gases not only have an offensive odor, but such gases may cause damage to vegetation, painted surfaces and wildlife, as well as constitute a significant health hazard to humans. Government wide regulations have increasingly imposed continuously lower tolerances on the content of hydrogen sulfide which can be vented to the atmosphere, and it is now imperative in many localities to remove virtually all the hydrogen sulfide under the penalty of an absolute ban on continuing operation of a plant or the like which produces the hydrogen sulfide-containing gaseous stream.

The quantities of hydrogen sulfide in process gas streams are not very high. U.S. Pat. No. 3,071,433, dated Jan. 1, 1964 to Dunn, indicates that the stack gases obtained in the concentration of black liquor, the waste pulping liquor of the Kraft pulping process, contain from 500 to 2000 parts per million (ppm) of hydrogen sulfide. However, the odor of hydrogen sulfide can be detected by humans at a concentration of approximately 0.01 ppm. Consequently, an extremely efficient process for the removal of hydrogen sulfide is required to eliminate small amounts of noxious hydrogen sulfide from process gases.

Carbon dioxide may also be present with hydrogen sulfide as contaminants of gases, such as from well casings, combustion floods, geothermal steam, or tank vapors. Often, it is not only desirable to remove $H_2S$ from such gases, but to selectively remove $H_2S$ and not remove the carbon dioxide.

One well known method in the art for removing hydrogen sulfide from gas streams involves contacting the gas stream with caustic soda, which scrubs the acid gases from the gas stream. U.S. Pat. No. 2,747,962 to Heitz et al provides a method whereby acid gases, such as hydrogen sulfide, are removed selectively from a gas stream also containing carbon dioxide using an alkaline liquid, such as caustic soda, to remove the acid gas. The absorption of the $CO_2$ is much slower than the absorption of $H_2S$, and thus the absorption of $CO_2$ can be prevented by maintaining a very short contact time (0.01–0.02 second) between the gas stream and alkaline liquid. However, a disadvantage of this process is that when the alkaline liquid is regenerated by heating to around 270° F., $H_2S$ is produced, and thus the $H_2S$ disposal problem is not solved but merely postponed.

It is also known to effect removal of hydrogen sulfide in an oxidation-reduction system by contacting the hydrogen sulfide-containing gas stream with a solution of a polyvalent cation (such as iron) complexed with a chelating agent (such as ethylenediaminetetraacetic acid or sodium salt thereof). In such a process, iron in the ferric state oxidizes the hydrogen sulfide to sulfur, the iron is reduced to the ferrous state, and the solution is regenerated by aeration to convert the iron back to the ferric state. The sulfur is recovered from the solution by froth flotation.

For example, U.S. Pat. No. 4,036,942 to Sibeud et al discloses a process for removing hydrogen sulfide and alkyl mercaptans from fluid stream by reaction with oxygen in the presence of a metal amino acid chelate in aqueous solution containing an amine, resulting in the conversion of hydrogen sulfide to sulfur and alkyl mercaptans to dialkyldisulfides, and separating these from the aqueous metal chelate solution. However, the presence of oxygen in the reactants is disadvantageous in that this results in the conversion of sulfur to sulfates and thiosulfates. Furthermore, the reaction requires a relatively long contact time between the metal chelate solution and the hydrogen sulfide-containing gas stream, such that if carbon dioxide is also present in the gas stream, the required contact time results in the absorption of carbon dioxide into the reaction solution, thus lowering the pH and lowering the efficiency of the reaction.

U.S. Pat. No. 4,009,251 to Meuly also discloses a process for removing hydrogen sulfide and alkyl mercaptans from gaseous streams by oxidizing the hydrogen sulfide to sulfur substantially without formation of sulfur oxides, in the presence of a metal chelate catalyst solution and a soluble alkali metal, or alkali earth metal or ammonium or amine salt of an acid having a pK within the range of about 1.2 to about 6. The alkyl mercaptans are oxidized to dialkyldisulfides under the same conditions. Meuly attempts to eliminate the oxidation of hydrogen sulfide through to sulfur oxides by the addition of the above-described acid salts. Such addition to the metal chelate catalyst solution is required, since Meuly reacts the hydrogen sulfide-containing gas stream with oxygen and recognizes that sulfur oxides may be formed by such a reaction mixture. Furthermore, the process of the above patent requires relatively long contact times for oxidation, and thus when carbon dioxide is present in the hydrogen sulfide-containing gas stream, the relatively long contact time also results in the absorption of $CO_2$ and the consequential reduction in the pH of the solution and reduction in the efficiency of the system.

SUMMARY OF THE INVENTION

It is an object of the present invention to provide a process for selectively removing hydrogen sulfide from a gaseous stream.

Additionally, it is an object of the invention to provide a process for selectively removing hydrogen sulfide from gas streams containing small amounts of hydrogen sulfide, and which also contain carbon dioxide.

A further object is to provide a process for selectively removing hydrogen sulfide from gas mixtures comprising a minor amount of hydrogen sulfide and a major amount of carbon dioxide.

Still yet another object of the present invention is to provide a process for selectively removing hydrogen sulfide from a gas stream by oxidizing the hydrogen sulfide to sulfur, by reaction of the hydrogen sulfide with a metal chelate solution and recovering the formed sulfur particles, while simultaneously regenerating the reduced metal chelate by froth flotation in which the regeneration is accomplished with greater efficiency than heretofore known regeneration processes.

The present invention provides a process for selectively removing hydrogen sulfide from gaseous streams additionally containing carbon dioxide, by contacting such gaseous streams with a polyvalent metal chelate solution having a pH greater than 7 for only a very short contact time, lower than 0.08 second, so as to prevent disadvantageous $CO_2$ absorption by the metal chelate solution. The hydrogen sulfide is oxidized to elemental sulfur by the metal chelate solution. The off gas and the reduced metal chelate solution containing the sulfur particles are separated and the sulfur particles recovered from the solution, while simultaneously regenerating the reduced metal chelate by bubbling oxygen or an oxygen-containing gas through the liquid by the use of a commercial froth flotation apparatus, conventionally used for separating oil from water. The solid sulfur produced is of high purity and, once separated from the solution, may be sold without any further chemical treatment.

The present invention also provides a process for the selective removal of hydrogen sulfide from a gaseous stream additionally containing carbon dioxide by contacting the gaseous stream with a polyvalent metal chelate solution, wherein the pH of the polyvalent metal chelate solution is constant because the net absorption-desorption of the carbon dioxide in the solution is 0; the contact being for a time sufficient to allow the polyvalent metal chelate to oxidize the hydrogen sulfide to elemental sulfur precipitate.

Further, the present invention is directed to the selective removal of hydrogen sulfide from a gaseous stream additionally containing carbon dioxide, comprising the step of contacting the gaseous stream with a polyvalent metal chelate solution having a pH value greater than 7 for a time between about 0.006 and about 0.08 seconds, wherein the pH of the polyvalent metal chelate solution is constant because the net absorption-desorption of the carbon dioxide in the solution is 0.

The present invention is further directed to a process for the selective removal of hydrogen sulfide from a gaseous stream additionally containing carbon dioxide, comprising the step of contacting the gaseous stream with a basic polyvalent metal chelate solution for a time sufficient to allow the polyvalent metal chelate solution to oxidize at least 80% of the hydrogen sulfide to elemental sulfur precipitate, wherein the pH of the polyvalent metal chelate solution is constant because the net absorption-desorption of the carbon dioxide in the solution is 0.

The present invention is further directed to a process for the continuous removal of hydrogen sulfide from a gaseous stream additionally containing carbon dioxide, comprising the steps of:

(a) contacting the gaseous stream with a polyvalent metal chelate solution, wherein the contact time is sufficient to allow the polyvalent metal chelate to oxidize the hydrogen sulfide to elemental sulfur precipitate, but below that time allowing the polyvalent metal chelate solution to absorb amounts of carbon dioxide sufficient to cause any decrease in the chelate solution pH value, wherein the pH of the polyvalent metal chelate solution is maintained so that the net absorption-desorption rate of the carbon dioxide in the solution is 0;

(b) separating a gas phase of reduced hydrogen sulfide content from a liquid phase containing reduced metal chelate solution having dispersed therein elemental sulfur particles;

(c) passing a sufficient amount of an oxygen-containing gas through a liquid phase to simultaneously regenerate the reduced metal chelate and to separate the elemental sulfur particles from the chelate solution by flotation;

(d) recovering the separated elemental sulfur particles; and (e) recycling the regenerated metal chelate solution to be utilized in step (a).

BRIEF DESCRIPTION OF THE DRAWING

FIG. 10 is a graph illustrating the dependence of regenerating the reduced metal chelate on the type of regeneration system utilized.

DESCRIPTION OF THE PREFERRED EMBODIMENTS

Figure 1:
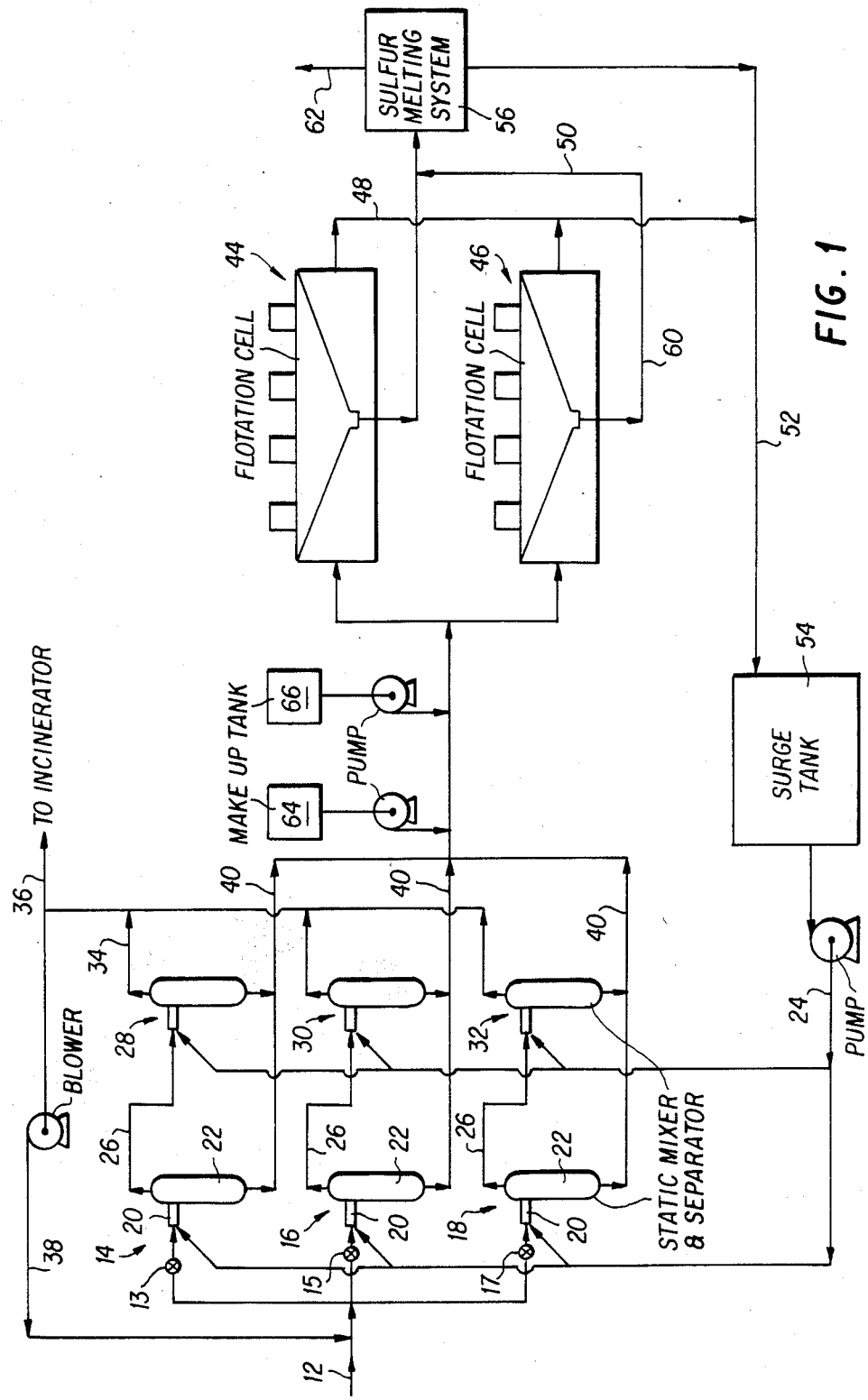
FIG. 1 is a schematic diagram of the present invention illustrating the routes of the various process streams.

The polyvalent metal chelate solutions employed in the process of the invention are coordination complexes in which the polyvalent metals form chelates with amino acids having one of the following general formulae:

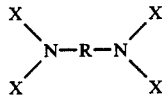

wherein
n is a number from 1 to 3;
X is selected from the class consisting of acetic and propionic acid groups;
A is 2-hydroxy ethyl, 2-hydroxy propyl, or an alkyl group having from 1 to about 4 carbon atoms.

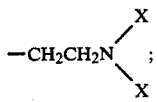

wherein
from two or four of the groups X are selected from the class consisting of acetic and propionic acid groups;
from zero to two of the groups X are selected from the class consisting of 2-hydroxy ethyl, 2-hydroxy propyl, and $$-CH_2CH_2N\begin{matrix}X\\X\end{matrix};$$

R is ethylene, propylene or isopropylene or, alternatively, cyclohexane or benzene, where the two hydrogen atoms replaced by nitrogen are in the 1,2-position.

As the polvalent metal, any polyvalent metal that exists in more than one oxidation stage can be used, but iron, copper and manganese are preferred, especially iron. The polyvalent metal should be capable of oxidizing hydrogen sulfide, while being reduced itself from a higher to a lower valence state, and should then be oxidizable by oxygen from the lower valence state to the higher valence state, in a typical redox reaction. Other polyvalent metals which can be used include lead, mercury, palladium, platinum, tungsten, nickel, chromium, cobalt, vanadium, titanium, tantalum, zirconium, molybdenum and tin.

The polyvalent metal chelates are readily formed in aqueous solution by reaction of an appropriate salt, oxide or hydroxide of the polyvalent metal and chelating agent in the acid form or an alkali metal or ammonium salt thereof. Exemplary chelating agents include amino acetic acids derived from ammonia or 2-hydroxy alkylamines, such as glycine, diglycine (amino diacetic acid), NTA (nitrilo triacetic acid), 2-hydroxy alkyl glycine, di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic derivatives of cyclic 1,2-diamines, such as 1,2-diamino cyclohexane-N, N-tetraacetic acid, and the amides of polyamino acetic acids disclosed in U.S. Pat. No. 3,580,950 to Bersworth.

A quantitative reaction is obtained at room temperature, so that there is no need to employ higher temperatures. However, higher temperatures can be used, if desired or necessary. For instance, hot gases can be treated provided that care is taken to compensate for the water lost by evaporation. The metal chelate solution is stable to at least about 100° C., and thus the reaction can be carried out at elevated temperatures, to at least about 100° C.

The pH of the system should be within the range from about 7 to about 11. The upper limit is present only because the metal chelate solutions are not stable at pH's higher than 11. However, the higher the pH the more efficient is the oxidation of $H_2S$ to sulfur; thus, if a metal chelate could be found to be stable at a pH higher than 11, such a metal chelate may be used. The most efficient range for a given set of conditions is from a pH of about 8 to about 10.5. If the chelate solution is acidic in the initial makeup or as a result of side reactions, it is necessary to buffer the solution by adjusting the pH to within the appropriate range by addition of an alkali metal hydroxide, for example, sodium hydroxide, an alkali metal or ammonium carbonate or bicarbonate or ammonium hydroxide.

Any gas-liquid contact system which insures good contact between the hydrogen sulfide-containing gas phase and liquid phase containing the metal chelate can be used. In either a continuous or intermittent flow system, concurrent, countercurrent, and cross-flows can be used. A preferred gas-liquid contact system is a static mixer which comprises a hollow tube having fixed internal baffles, no moving parts and no external power requirements other than required to cause flow. The particular baffle design uses blends or disperses all flowable materials with predictable precision. Many such static mixers are commercially available. The contact time between the gas and liquid phases in the static mixer is controlled by controlling the velocity of the streams and the length of the static mixer.

The present invention allows the selective removal of hydrogen sulfide from a gaseous stream additionally containing carbon dioxide by contacting the gaseous stream with a polyvalent metal chelate solution for a time sufficient to allow the absorption of hydrogen sulfide without any appreciable absorption of carbon dioxide. Although it is acknowledged that a minute portion of carbon dioxide will be absorbed in the chelate solution during the contact phase, any absorption of carbon dioxide in the contact phase will be nullified due to the desorption of carbon dioxide during the regeneration phase. Thus, the pH of the polyvalent metal chelate solution will remain constant at the contact phase because the net absorption-desorption of the carbon dioxide in the solution is zero.

The process of the present invention is applicable to any gaseous stream containing hydrogen sulfide in any concentration, even in very low concentrations of the order of a few parts per million. The process is particularly useful when carbon dioxide is also present, even at high levels (greater than 75% weight), in the gaseous stream containing hydrogen sulfide. Examples of gaseous streams which contain hydrogen sulfide and carbon dioxide include sour gases and waste gases from petroleum refining, shale oil and tar sands processing, coal gasification, gases recovered during crude oil and natural gas production, stack gases from cellulose pulping processes, gaseous eflluents from sewage disposal plants, tail gases from Claus Process units, and hydrogen sulfide waste gases from other chemical and industrial process.

The following equations illustrate the process reactions when an iron chelate is used as the catalyst to convert the hydrogen sulfide to elemental sulfur.
Absorption:

$$H_2S + 2OH^- \rightarrow S^{--} + 2H_2O$$

Oxidation:

$$2[Fe(X)]^{+++} + S^{--} \rightarrow S° + 2[Fe(X)]^{++}$$

Regeneration:

$$2[Fe(X)]^{++} + \tfrac{1}{2}O_2 + 2H^+ \rightarrow 2[Fe(X)]^{+++} + H_2O$$

Overall net reaction:

$$H_2S + \tfrac{1}{2}O_2 \rightarrow S° + H_2O$$

where X is the chelating agent.

The invention can best be understood with reference to the cyclic system for removal of hydrogen sulfide from a gaseous stream, as illustrated in FIG. 1. The cyclic system, generally indicated in FIG. 1 by reference 10, is particularly useful in the selective removal of hydrogen sulfide from hydrogen sulfide-containing gas streams which also contain major proportions of carbon dioxide. A hydrogen sulfide-containing gas stream enters system 10 on stream 12 and can be distributed to each of three static mixer-separator trains, comprising a static mixer 20 and a liquid-gas separator 22 immediately following. A ferric chelate solution having a pH above 7, enters each of the static mixer-separator trains 14, 16 and 18 from stream 24. No oxygen or oxygen-containing gas is introduced into the contact zone. As is disclosed by U.S. Pat. No. 4,009,251 to Meuly, the presence of oxygen in the contact zone tends to oxidize the hydrogen sulfide through to sulfur oxides, the formation of which is detrimental to the efficiency of the present invention. Thus, the process of the present invention eliminates the abeove problem by excluding oxygen from the contact zone. The regeneration of the reduced metal chelate with oxygen or an oxygen-containing gas is desirably kept to below 100% to ensure the absence of excess oxygen in the contact zone by recycling a regenerated chelate solution which is devoid of oxygen. The contact time between the gas and liquid phases in each static mixer 20 is kept less than 0.1 second, and preferably is kept between 10 and 80 milliseconds. The contact time is controlled by controlling the flow rate of the gas and liquid streams into the individual static mixers 20, which have fixed lengths and internal diameters. In the contact zone of the static mixer 20, the hydrogen sulfide in the inlet gas is oxidized instantaneously to elemental sulfur by the iron chelate solution. The sulfur solids precipitate as a slurry in the treating solution. The off gas stream 26, taken from overhead each separator 22 of the individual static mixer-separator trains, is conveyed to a respective second static mixer-separator train 28, 30 and 32. The static mixer and separator structure in each static mixer-separator train 28, 30 and 32 is equivalent to static mixer 20 and separator 22 in the first static mixer-separator train 14, 16 and 18. The gas from stream 26 is contacted with metal chelate solution from stream 24 in each second mixer-separator train, preferably for about 10 to 80 milliseconds. The off gas, taken overhead each separator in static mixer-separator train 28, 30 and 32, leaves the individual separator at stream 34 which feeds stream 36, which conveys the off gas to an incinerator. Stream 38 is a bi-pass stream which feeds the off gas to feed stream 12 if extra feed gas is needed to obtain the required residence time in the static mixtures.

Often, feed gas stream 12 will not be of the correct volume flow rate to provide the desired residence time in the static mixers for selective H$_2$S removal. The parallel static mixers 14, 16 and 18 are used to divide the feed stream and provide the required gas flow through each mixer. Valves 15, 17 and 19 allow control of the feed gas into the desired static mixer.

The liquid containing the reduced metal ion and sulfur solids from each of the separators 22 in the first and second static mixer-separator trains is piped via stream 40 to stream 42 which feeds a pair of tanks 44 and 46, which can be generally referred to as the regeneration stage of process 10. In the regeneration stage of the process, the iron which has been reduced during the oxidation of hydrogen sulfide to sulfur is regenerated (oxidized) to the higher oxidation state, and the sulfur particles which are suspended in the slurry are separated by froth flotation. The chelated iron contained in the liquid entering tanks 44 and 45 from stream 42 is approximately 60% by weight ferric iron chelate and 40% by weight ferrous iron chelate. Tanks 44 and 46 comprise a plurality of flotation cells, preferably "WEMCO" cells sold by Envirotech Corp. In each cell, an oxygen-containing gas, such as air, is carried into the liquid by a vacuum formed during the movement of a rotor within the body of liquid. The oxygen-containing gas is dispersed in minute bubbles, which carry the suspended sulfur to the top of each cell and which oxidizes the reduced iron. The regenerated solution is piped via streams 48 and 50 from tanks 44 and 46, respectively, to a surge tank 54 via line 52. The regenerated solution is pumped back to the static mixer-separator trains via line 24.

The sulfur and residual metal chelate solution from tanks 44 and 46 is piped to a sulfur melting system 56 via lines 58 and 60. The molten sulfur is sold off stream 62 and any remaining iron chelate solution is piped back to surge tank 54 via stream 52. Iron chelate solution make-up and pH adjusting solution are stored in tanks 64 and 66 and can be pumped into the system when needed.

Experimental

Figure 2:
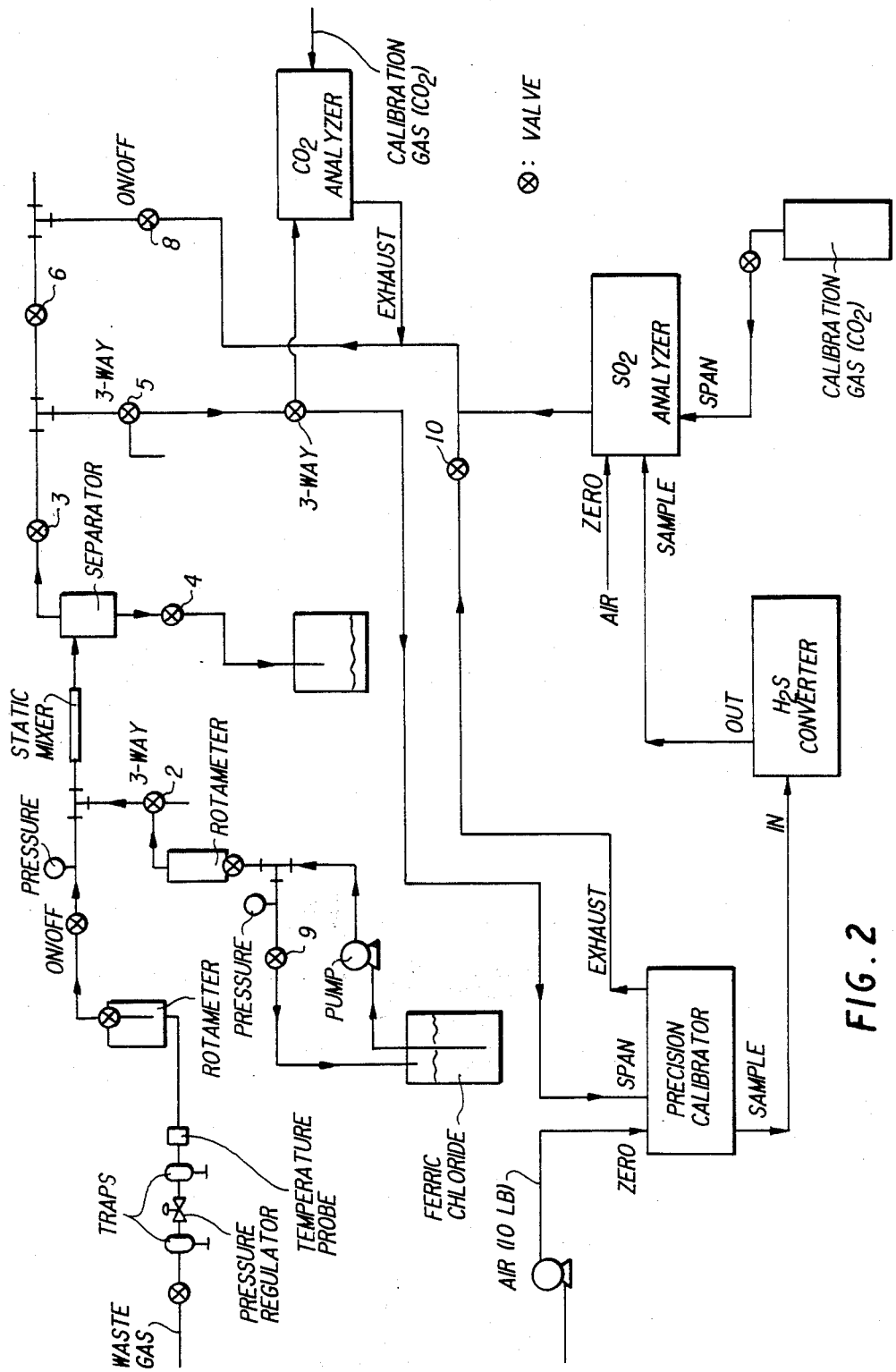
FIG. 2 is a schematic diagram of the test apparatus used to determine the dependence of selective hydrogen sulfide removal on various factors.

The system, as shown in FIG. 2, was used to selectively remove hydrogen sulfide from the waste gas produced in an oil field. The hydrogen sulfide-containing gas stream tested had a composition of approximately 1.2% hydrogen sulfide, 88% carbon dioxide, 5% nitrogen and 5.8% hydrocarbons, all by volume.

The metal chelate solutions used comprised a mixture of ferric chloride and EDTA (ethylene diamine tetraacetic acid). The relative mixtures of the iron chelate solutions used in the analysis are shown in Table 1. The initial pH of the solutions were varied using sodium carbonate, sodium bicarbonate and sodium hydroxide.

TABLE 1

| Solution No. | Run No. | FeCl$_3$ (g) | EDTA (g) | Distilled Water (l) | Sodium Carbonate (g) | Sodium Bicarbon. (g) | Sodium Hydroxide (Ml 12.5%) | pH |
|---|---|---|---|---|---|---|---|---|
| 1* | 1 | 316 | 486 | 18 | 162 | 297 | — | 7.6 |
| 2 | 2 | 316 | 486 | 18 | 110 | 297 | 90 | 8.6 |
| 3 | 3,4 | 316 | 486 | 18 | 20 | 50 | 350 | 8.6 |

TABLE 1-continued

| Solution No. | Run No. | FeCl$_3$ (g) | EDTA (g) | Distilled Water (l) | Sodium Carbonate (g) | Sodium Bicarbon. (g) | Sodium Hydroxide (Ml 12.5%) | pH |
|---|---|---|---|---|---|---|---|---|
| 4 | 5,6 | 316 | 486 | 18 | 20 | 50 | 350 | 8.6 |
| 5 | 7 | 316 | 486 | 18 | 125 | — | — | 8.7 |
| 6A | 8 | 327 | 505 | 8 | 187 | — | — | 8.5 |
| 6B** | 9 | — | — | — | — | — | — | 8.5 |
| 7A | 10 | 316 | 486 | 18 | 145 | — | — | 9.2 |
| 7B** | 11,12 | — | — | — | — | — | — | 10.2 |

*Sequence of addition of carbonates affected pH
**Not a new solution - added sodium carbonate to increase pH The field waste gas being supplied at 25 lbs of pressure was passed through a first trap to collect any condensed liquid prior to passing through a pressure regulator, where the pressure is dropped from 25 lbs to 6 lbs. A second trap was used to collect any condensed liquids that may have formed due to the pressure drop in the pressure regulator, thus supplying a dry saturated gas to the test system.

The gas-liquid contact time of absorption in the static mixer was varied from 0.006 second to 0.08 second by varying the gas flow rate in order to determine the optimum residence time needed to obtain selective hydrogen sulfide removal. The pH was varied from 7.75 to 10.2 to observe the effect of pH on hydrogen sulfide removal. Two lengths of ¼-inch diameter static mixers were tested, 2 inches long and 4 inches long. Finally, two concentrations of iron chelate solution were used, 0.065N and 0.13N. Table 2 shows the combinations of these variables which were tested.

TABLE 2

| | Contact Time (Seconds) | Length Static Mixer (Seconds) | pH | Gas Flow Rate (l/min) | Ferric Concentration (Normality) |
|---|---|---|---|---|---|
| 1 | 0.02 | 2 | 7.75 | 5 | 0.065 |
| 2 | 0.02 | 2 | 8.67 | 5 | 0.069 |
| 3 | 0.04 | 2 | 8.67 | 2,5 | 0.065 |
| 4 | 0.04 | 4 | 8.67 | 5 | 0.065 |
| 5 | 0.08 | 4 | 8.72 | 2,5 | 0.065 |
| 6 | 0.04 | 4 | 8.72 | 5 | 0.065 |
| 7 | 0.04 | 4 | 8.5 | 5 | 0.130 |
| 8 | 0.02 | 2 | 8.5 | 5 | 0.130 |
| 9 | 0.02 | 2 | 9.0 | 5 | 0.130 |
| 10 | 0.02 | 2 | 9.2 | 5 | 0.065 |
| 11 | 0.02 | 2 | 10.2 | 5 | 0.065 |
| 12 | 0.006 | 2 | 10.2 | 8.3 | 0.065 |

Figure 3:
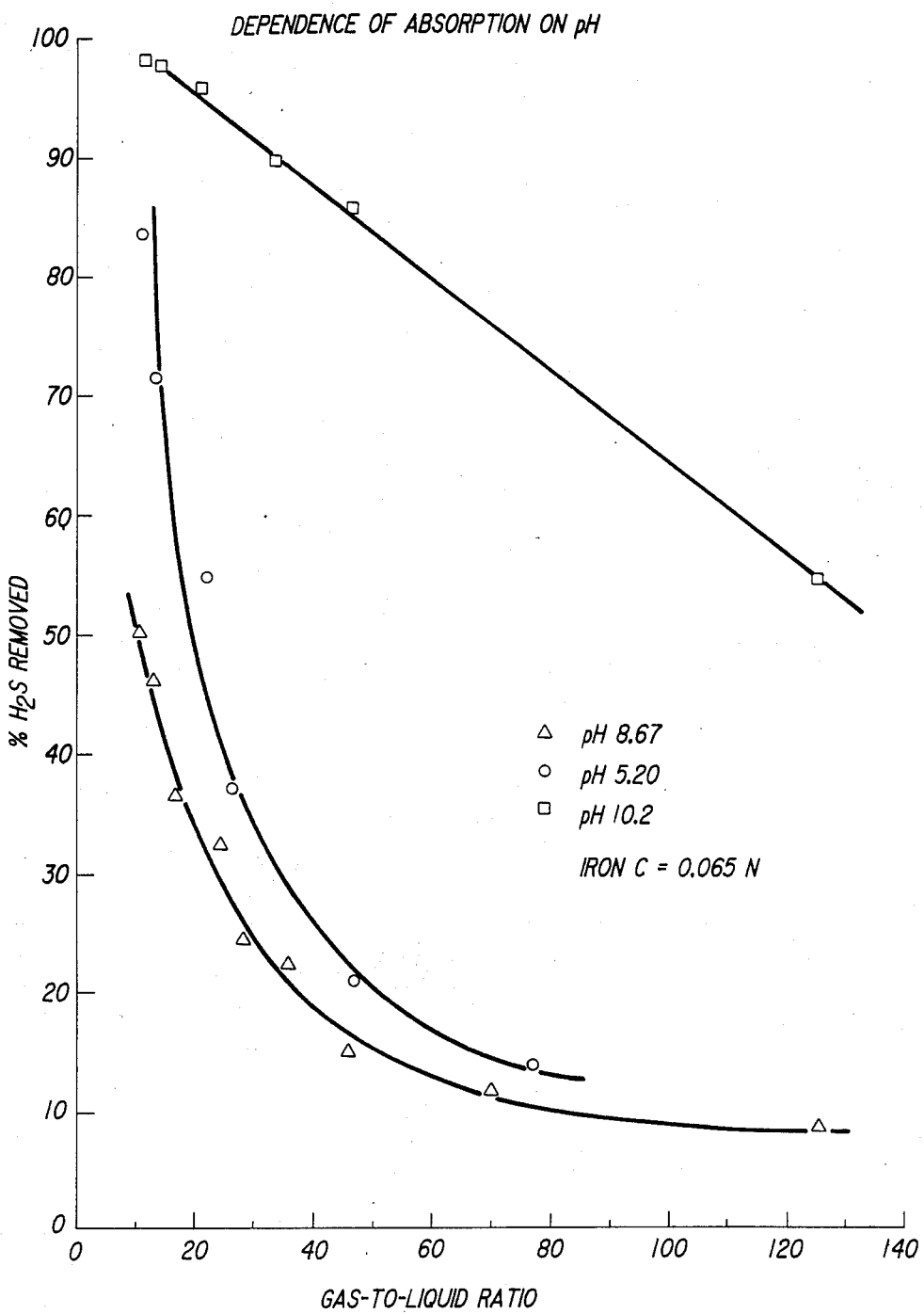
FIG. 3 is a graph illustrating the dependence of hydrogen sulfide removal from the gas stream on pH.

As can be seen in FIG. 3, the removal of hydrogen sulfide increases as the pH increases at corresponding gas-to-liquid ratios. This indicates that the hydrogen sulfide removal rate is mainly limited by the hydroxyl ion concentration. At high pH's and gas-to-liquid ratios, all the ferric ions were converted to the ferrous state instantaneously, illustrating that the conversion of the sulfide ion-to-sulfur is also instantaneous.

Figure 4:
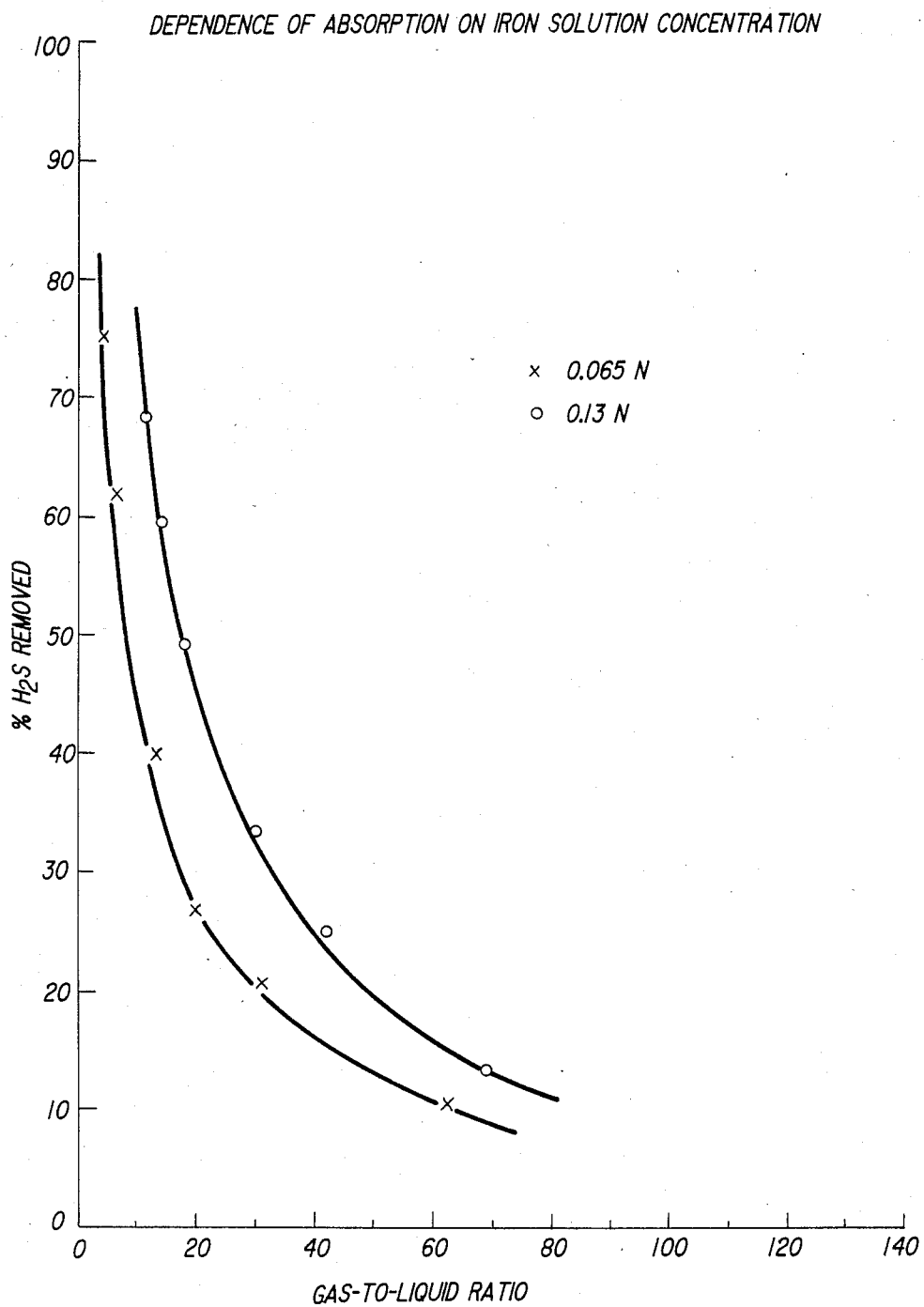
FIG. 4 is a graph illustrating the dependence of hydrogen sulfide removal on the iron solution concentration.

From FIG. 4, it is evident that doubling the iron chelate concentration did not double the amount of hydrogen sulfide removed from the gas stream. Although the higher concentrations of iron chelate solution removed more hydrogen sulfide, the conversion efficiency of the higher concentrate solution is lower and may not be as economical as the dilute solution. Pumping costs, as well as chemical costs, would have to be balanced with hydrogen sulfide absorption efficiencies to determine the economic iron chelate solution concentration.

Figure 5:
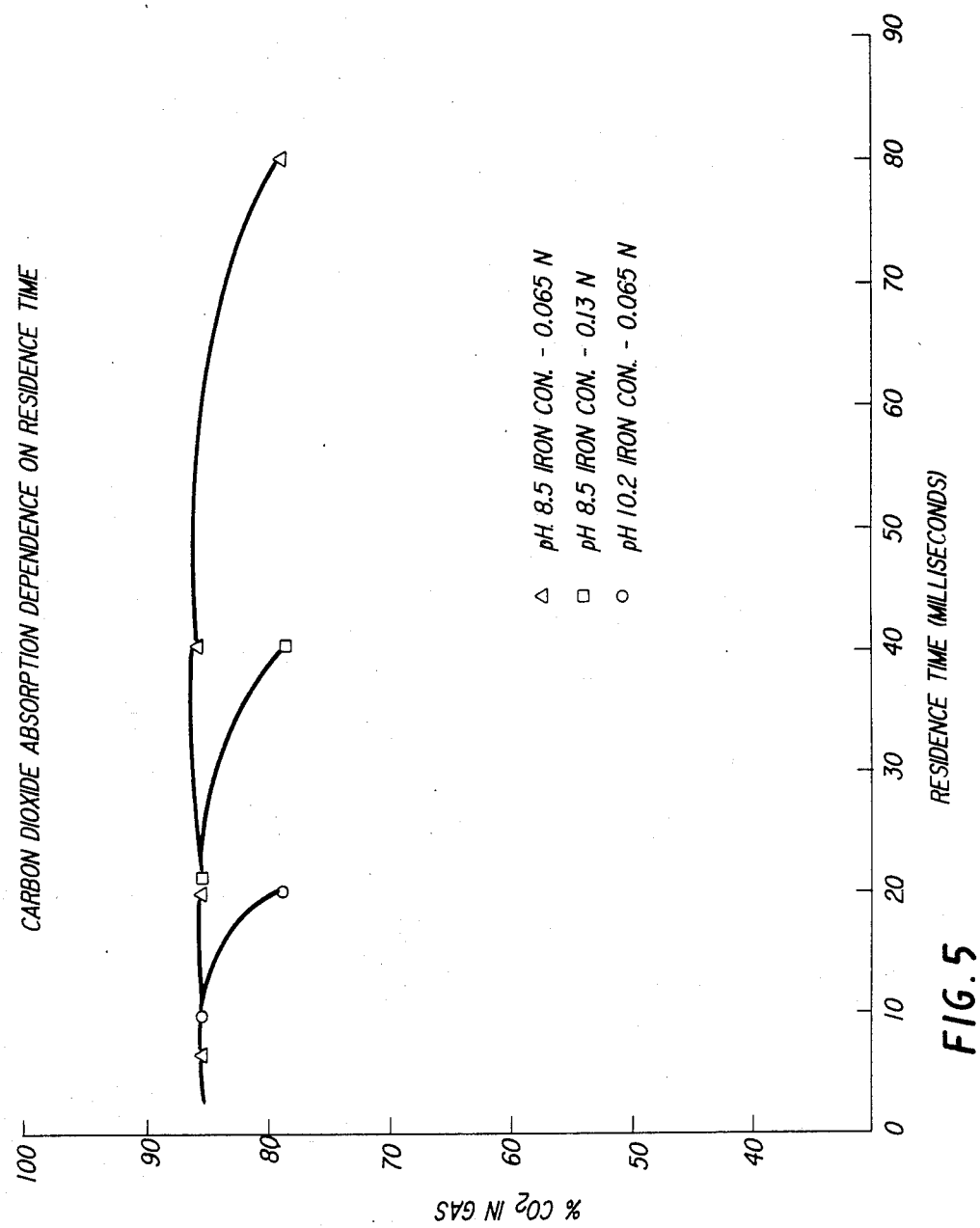
FIG. 5 is a graph illustrating the dependence of carbon dioxide absorption on residence time in the static mixture.

The liquid-gas contact time was varied to determine the optimum residence time in the static mixture needed to obtain selective absorption of hydrogen sulfide with minimum dioxide absorption. The oxidation of H$_2$S to elemental sulfur is more efficient at higher pH values; therefore, disadvantageous amounts of CO$_2$ are those which cause a reduction in the pH of the polyvalent metal chelate solution, affecting the efficiency of the H$_2$S oxidation process. It is preferred that no CO$_2$ absorption occurs or no pH reduction is achieved, or at least that the absorption of CO$_2$ is insufficient to cause a reduction in the pH value of the polyvalent metal chelate solution. The results, as shown in FIG. 5, illustrate the carbon dioxide absorption dependence on residence time with three different solutions. At a pH of 10.2, the maximum residence time required to obtain the selective absorption of hydrogen sulfide without any carbon dioxide absorption is between 10–20 milliseconds, compared with 40–80 milliseconds for a solution at a pH of 8.5. Both of the solutions were identical, except for additional sodium carbonate being added to the higher pH solution, to obtain such pH. FIG. 4 also shows the absorption of CO$_2$ with an iron chelate concentration of twice the other solutions at a pH of 8.5. The maximum residence time for selective removal of hydrogen sulfide without any appreciable absorption of carbon dioxide for this solution is 20–30 milliseconds. This latter solution also contains a different amount of sodium carbonate. Since the iron chelate concentration should have little or no effect on the absorption of carbon dioxide, the absorption of carbon dioxide is dependent on the concentration of carbonate in this solution. However, this absorption of CO$_2$ is overshadowed by the dependence of CO$_2$ absorption on contact time. Thus, the dependence of CO$_2$ on the carbonate is not very important. If sodium hydroxide is used to adjust the pH, the stability of the solution is weakened. When any form of sodium hydroxide was added to the iron chelate solution, a localized pH developed which precipitated iron hydroxide. The iron hydroxide is difficult to dissolve in the iron chelate solutions used and only very slowly goes back into the solution to the chelate complex.

Figure 6:
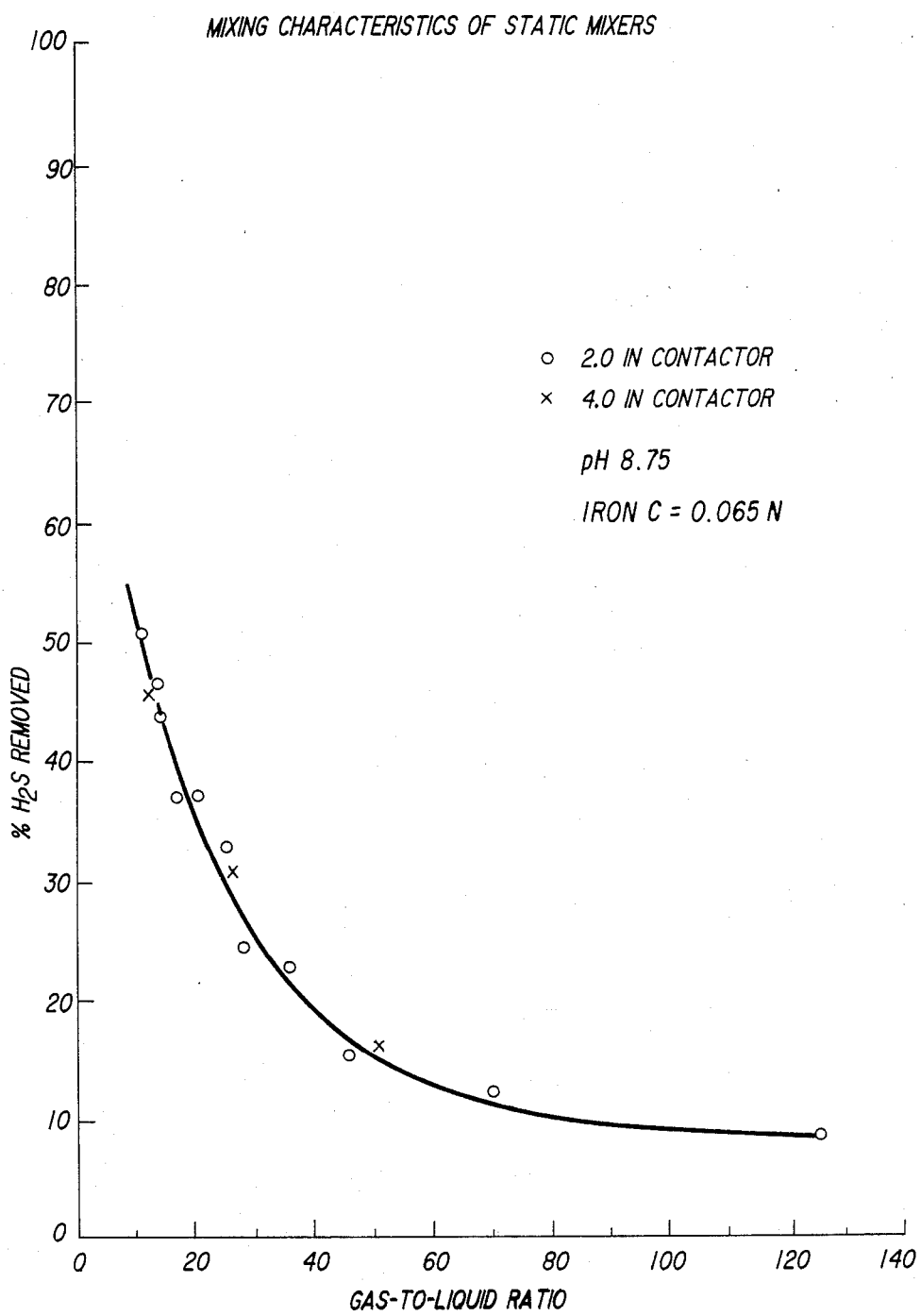
FIG. 6 is a graph illustrating the dependence of hydrogen sulfide removal on the length of the static mixture.

Mixing characteristics were investigated by doubling the static mixer length to determine whether perfect mixing has been achieved by the shorter mixer. FIG. 6 illustrates that no difference in absorption was seen when the mixer length was doubled; therefore, perfect mixing was achieved with the 2 inch static mixer, which contained 6 baffle elements.

Figure 7:
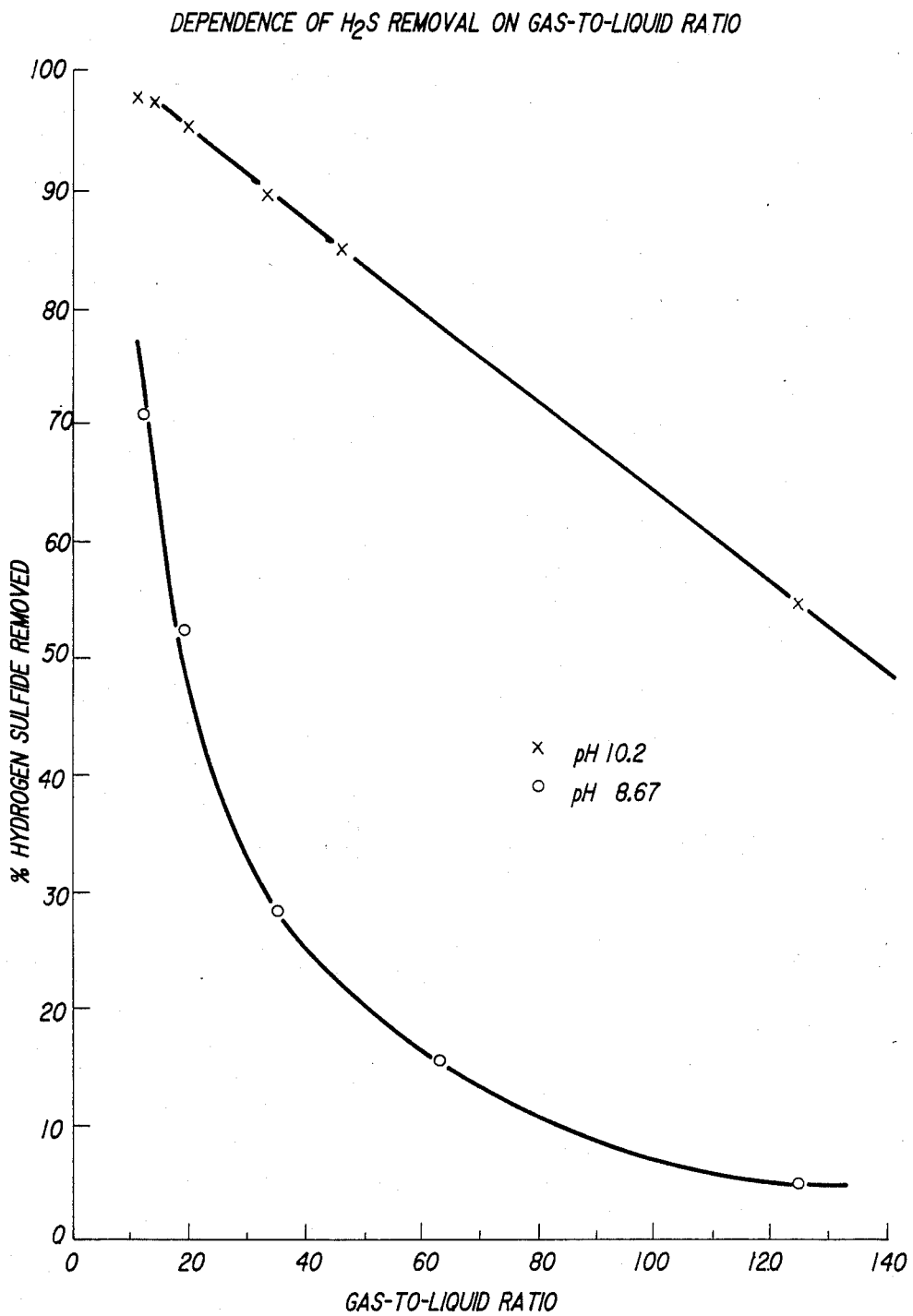
FIG. 7 is a graph illustrating the dependence of hydrogen sulfide removal on the gas to liquid ratio.

The percent of hydrogen sulfide removed is a function of the amount of liquid in contact with the gas, i.e., gas-to-liquid ratio. As seen in FIG. 7, the percent of hydrogen sulfide removed from the gas stream versus the gas-to-liquid ratio is an exponential function when the solution pH is lower than 10. At the higher pH of 10.2, the function is linear. At pH of 10 or higher, adequate hydrogen sulfide absorption can be maintained at more economic gas-to-liquid ratios.

The hydrogen sulfide-containing field gas was further tested utilizing a static mixer having a diameter of 2 inches and being 21 inches long. At a flow rate of 225 MCFD of field gas, the residence time in the static mixer was 15 milliseconds. The iron chelate solution used was supplied by Dow Chemical Company, in which the iron was chelated with HEDTA (n-hydroxyethyl ethylenediamine triacetic acid). The chelate solution contained 0.25 wt % iron. The iron chelate solution was pumped into the static mixer at a rate of 28 gallons per minute which, when combined with the gas feed of 225 MCFD, gave a contact time of 15 milliseconds with a gas-to-liquid ratio of 50 to 1.

Figure 8:
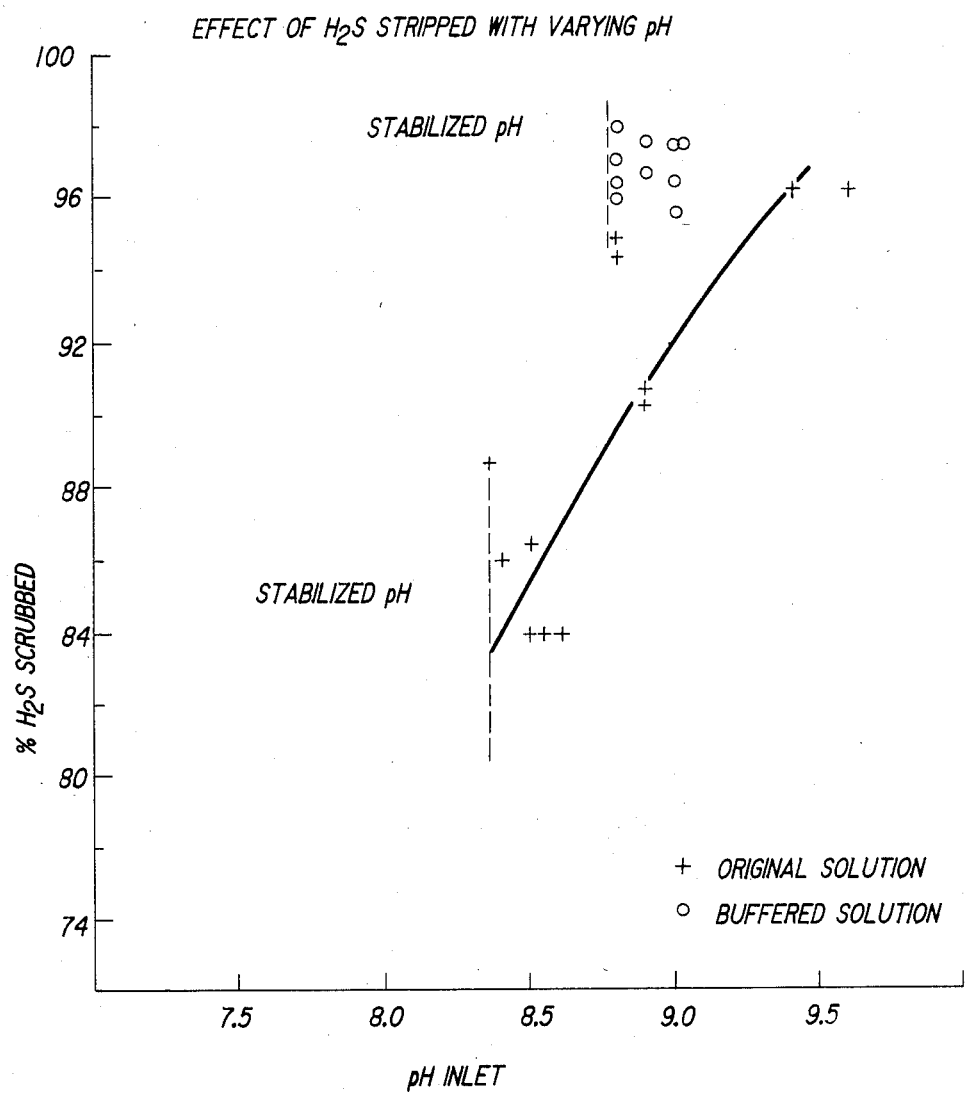
FIG. 8 is a graph illustrating the effect of hydrogen sulfide removal with varying pH.

A sufficient amount of sodium carbonate was added to the iron chelate solution to provide a pH of 9.6. As shown in Table 3, after 21 hours of use the pH of the solution dropped to 8.5. Additional carbonate was added to bring the pH back up to 9.0 and, after 11 hours of use, the solution was stabilized at a pH of 8.8, while resulting in 98% removal of hydrogen sulfide from the gas stream. The effect of the pH on hydrogen sulfide removal is summarized in FIG. 8.

TABLE 3

| pH In | pH Out | Percent H$_2$S Scrubbed | Gas-to-Liquid Ratio v/v | Hours Solution Run |
|---|---|---|---|---|
| 9.6 | 8.9 | 96.4 | — | 4.0 |
| 9.4 | 8.8 | 96.4 | 35.7 | 7.0 |
| 8.8 | 8.2 | 95.0 | 48.5 | 8.5 |
| 8.9 | 8.2 | 91.8 | 45.7 | 9.5 |
| 8.9 | 8.1 | 91.4 | 58.7 | 11.5 |
| 8.9 | 8.1 | 95.5 | 38.2 | 13.5 |
| 8.8 | 7.6 | 94.4 | 53.1 | 15.5 |
| 8.5 | 7.5 | 84.0 | 48.7 | 16.5 |
| 8.5 | 7.5 | 84.0 | 41.7 | 17 |
| 8.6 | 7.0 | 84.0 | 41.4 | 17.5 |
| 8.5 | 7.6 | 86.5 | 44.9 | 18.5 |
| 8.4 | 7.3 | 86.5 | 41.7 | 19.5 |
| 8.4 | 7.3 | 88.8 | 41.7 | 20.5 |
| Add Carbonate: | | | | |
| 9.0 | 8.5 | 96.5 | 41.7 | 1 |
| 9.0 | 8.4 | 95.6 | 50.8 | 2 |
| 9.0 | 8.5 | — | 41.7 | 3 |
| 9.0 | 8.5 | 97.6 | 34.4 | 4 |
| 9.0 | 8.5 | 87.6 | 43.5 | 5 |
| 8.9 | 8.5 | 96.8 | 38.2 | 6 |
| 8.9 | 8.5 | 97.6 | 38.9 | 7 |
| 8.8 | 8.2 | 96.0 | 47.2 | 8 |
| 8.8 | 8.0 | 96.4 | 47.2 | 9 |
| 8.8 | 8.0 | 97.2 | 50.2 | 10 |
| 8.8 | 8.0 | 98.0 | 42.5 | 11 |

Regeneration

In the contact zone of the static mixer, the hydrogen sulfide in the inlet gas is oxidized to elemental sulfur by the iron chelate solution, as described above, and sulfur solids are formed as a slurry in the treating solution. The reduced iron chelate solution containing the sulfur solids is pumped into a regeneration station, where the chelate is regenerated (oxidized to the higher valent state) by bubbling oxygen or an oxygen-containing gas through the solution. Air is the preferred oxygen-containing gas.

Figure 9:
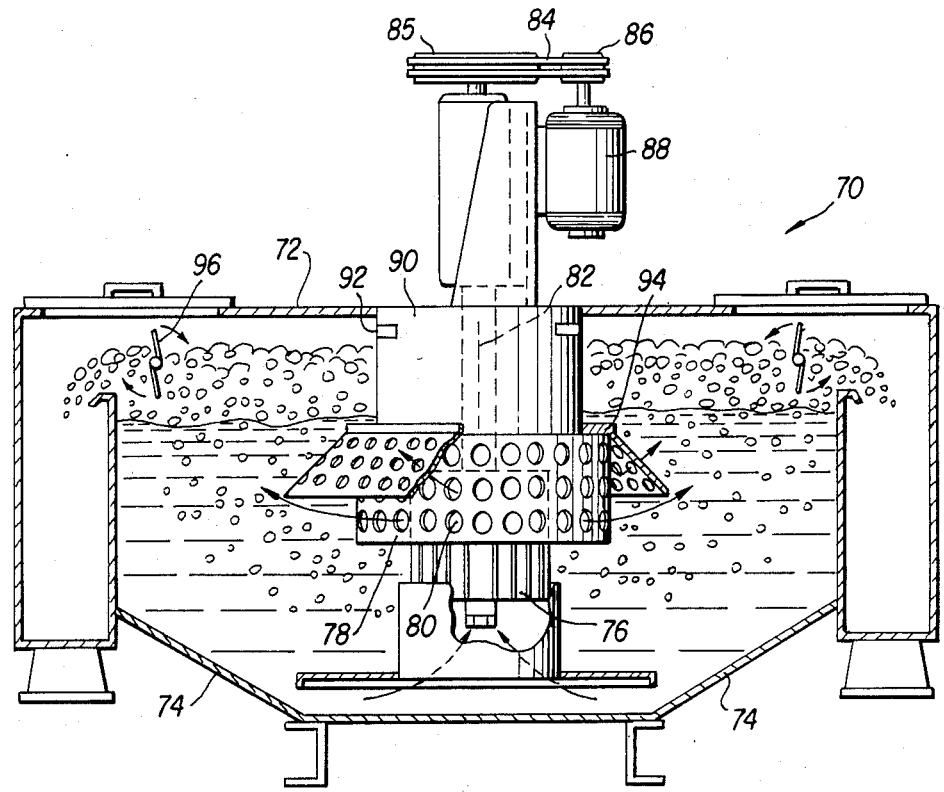
FIG. 9 is a cross-sectional view of the froth flotation apparatus which is utilized to recover the sulfur particles and regenerate the reduced metal chelate solution.

The preferred regeneration apparatus used in the present invention is a commercial flotation cell marketed under the trade name WEMCO. Such apparatus has been used to separate oil from oil and water mixtures. It has now been found that the WEMCO flotation cell acts very efficiently as a reactor for gas-liquid phase chemical reactions and is further capable of separating any solids which may be present before or after completion of the reaction. The preferred regeneration apparatus, depicted in FIG. 1 as tanks 44 or 46, consists of several flotation cells, one of which is shown in FIG. 9. The apparatus shown in FIG. 9 is generally indicated by reference 70. Reference is made to U.S. Pat. Nos. 3,491,880 and 3,647,069, which further disclose the flotation apparatus. Each tank 44 or 46 comprises four such flotation cells 70. Each flotation cell 70 comprises a tank 72, which includes inwardly inclined lower sidewall portions 74.

Each cell 70 includes a rotor 76 and a disperser 78 surrounding at least the upper portion of said rotor and circumferentially spaced from rotor 76. Dispenser 78 contains a plurality of fluid passage openings 80 uniformly spaced along substantially the entire circumferential surface of disperser 78. Rotor 76 is fixed to the bottom of a shaft 82 and is supported a substantial distance above the bottom wall of tank 72 for rotation about an upright, and preferably essentially vertical, axis. Rotor 76 is positively rotated through belts 84 and pulleys 85 and 86 by a motor 88. Motor 88 is supported above the top of tank 72. A stand pipe 90 surrounds shaft 82 and forms a conduit for air from above the liquid level in tank 72 to the interior of tank 72 at the vicinity of rotor 78. An air intake 92 is formed in stand pipe 90 above the liquid level of tank 72. Secured to the upper edge of disperser 78 is a downwardly outwardly flaring perforated disperser hood 94.

Ferrous iron chelate solution containing the suspended sulfur particles is introduced into tank 72 of cell 70. As rotor 76 spins, the rotating motion forms a vortex and forces water through fluid openings 80 of disperser 78, and thus creates a vacuum in stand pipe 90. The vacuum draws air through air intake 92 down stand pipe 94 for dispersion in the iron chelate solution and thoroughly mixes the gas with the solution. As the gas-liquid mixture travels through disperser 78 at high velocities a shearing force is created, causing the gas to form minute bubbles. As the air bubbles float through the metal chelate solution, the bubbles carry with them the sulfur particles to the surface of cell 70. Skimmer paddles 96 remove the sulfur particles concentrated at the surface of the metal chelate solution. Additionally, the air, or any other oxygen-containing gas, oxidizes the ferrous ion to the ferric ion to regenerate the iron chelate, which can be recycled and conveyed to the static mixers for hydrogen sulfide oxidation.

It has been found that the WEMCO flotation cell is highly efficient in oxidizing the ferrous chelate iron to the ferric chelate. In FIG. 10, the time needed to regenerate substantially all of the ferrous iron chelate is illustrated for three types of regeneration systems, e.g., bubble tank, packed tower and WEMCO. The WEMCO was operated at 1200 rpms and air was the oxygen-containing gas which was dispersed in the solution. As can be seen in FIG. 10, the WEMCO flotation apparatus regenerated the ferrous iron chelate solution in 1 to 2 minutes, while the bubble tank took 50 minutes to regenerate 87% of the total iron to the ferric ion. Normal field applications would regenerate the solution from the 40% ferrous state. The packed column test was operated as a flowing system, while various regeneration times were achieved by varying the liquid hold-up in the column. The inlet ferrous percentage for the packed column was maintained at 40%. With a 10 minute hold-up time, the packed column regenerated 70% of the iron ions to the ferric state.

The WEMCO flotation cell operated with the highest regeneration efficiency and has definite advantages over other regeneration systems. When using the WEMCO flotation cell, no air blowers are required because the air is dispersed in the solution due to the low pressure vortex created in the stand pipe by rotation of the rotor. Furthermore, with the WEMCO flotation cell, the sulfur is concentrated by frothing action, therefore reducing the solution inventory to be filtered. It has been found that the induced gas flow into the liquid and the shearing action of the gas-liquid mixture through the disperser yields a higher efficiency of regeneration of the reduced metal chelate. Aerators which induce a flow of air through a liquid without the gas-liquid shearing action of the WEMCO may not be as efficient at regenerating the reduced metal chelate. An example of such an aerator for oxidizing hydrogen sulfide in a liquid in U.S. Pat. No. 4,309,285 issued Jan. 5, 1982.

As stated in reference to FIG. 9, the sulfur is recovered from the surface of the solution in each of the flotation cells 70 which make up tanks 44 and 46. The sulfur particles and residual metal chelate solution is then subjected to heat treatment at about 270° F. to melt the sulfur. It is advantageous to use an excess of chelating agent, particularly when the metal is iron chelated with HEDTA. It has been found that a 6% or more molar excess of chelating agent keeps the iron in stable solution during gas-liquid contact, regeneration and sulfur melting, such that there is no appreciable iron precipitation as hydroxide. The loss of iron is thus prevented. When HEDTA is used as the chelating agent, a 6% molar excess is needed when the regenerated chelate solution is at a pH of about 8.8. Since the increase in pH renders the iron chelate solution less stable, it is believed that a large excess is needed as the pH is increased. The amount of excess is dependent upon the chelating agent which is used and, accordingly, other iron chelates may need more or less excess of chelate to keep the iron stable under the operating conditions. The molten sulfur has a density of 1.808 g/cc, which is substantially higher than the residual metal chelate solution and, accordingly, the molten sulfur is collected at the bottom of the heating vessel. The sulfur recovered is of high purity and may be recovered directly from the vessel and sold as such. Other separation systems, such as filters or centrifuges, can be used.

To further increase the regeneration rate of the chelated ferrous solution to chelated ferric solution, an oxidizing adjunct including dihydroxybenzenes (hydroquinones), anthraquinones and naphthaquinones, which represent a "half way" stage between hydroquinones and dihydroxydurene, can be added to the metal chelate solution. Anthraquinone is water insoluble, so the molecule is partly sulphonated to enhance water solubility. Preferably, 2-7 anthraquinone disulphonic acid disodium salt (ADA) is used to increase the oxidation rate of the reduced metal chelate. Of course, the various isomers of anthraquinone disulphonic acid may also be used. As shown in Table 4, the regeneration rate of ferrous iron is enhanced with the addition of ADA. The ADA is then oxidized by the oxygen-containing gas in the regeneration stage. ADA may also react with the hydrogen sulfide to produce elemental sulfur. It has been found, however, that the presence of ADA in the gas-liquid contact zone of the static mixture produces undesirous sulfur compounds.

TABLE 4

Effect of ADA on Regeneration of Chelated Iron Solution*

| Amount of ADA g/l | Percentage Ferrous Iron Regenerated % | Regeneration Time (min) | Air-to-Liquid Ratio |
|---|---|---|---|
| 0 | 39 | 1.2 | 58 |
| 0.25 | 58 | 1.0 | 50 |
| 3.0 | 55 | 1.2 | 55 |
| 0 | 60 | 5.3 | 58 |
| 0.25 | 89 | 4.0 | 53 |
| 0 | 43 | 8.5 | 12 |
| 0.25 | 78 | 4.0 | 16 |
| 3.0 | 98 | 5.3 | 21 |
| 0 | 52 | 5.3 | 29 |
| 0.25 | 78 | 4.0 | 38 |

*Apparatus was packed column

It is important to eliminate the presence of oxygen in the contact zone between the polyvalent metal chelate and the hydrogen sulfide-containing gaseous stream in order to prevent the formation of sulphates, thiosulphates and sulfur oxides. This can be done by advantageously allowing the regeneration of less than 100% of the reduced chelate, thus assuring that no excess oxygen is present in the regenerated solution.

As can be seen from the above, the present invention allows the selective removal of hydrogen sulfide from a gaseous stream additionally containing carbon dioxide, even in major amounts, by contacting the gaseous stream with a polyvalent metal chelate solution for a time sufficient to allow the removal of hydrogen sulfide without any appreciable absorption of $CO_2$. The absorption of $CO_2$ would be disadvantageous because it would lead to a reduction in pH. As evident from FIG. 3, a slight reduction in the pH of the polyvalent metal chelate solution leads to a substantial reduction in hydrogen sulfide removal. Thus, the efficiency of the process of the invention is substantially reduced with the decrease in pH.

The contact time between the hydrogen sulfide hydrogen-containing gas and the polyvalent metal chelate solution should preferably be limited to about 80 milliseconds (0.08 second) or less; otherwise, carbon dioxide absorption by the chelate solution will result in a decrease in the pH of the solution.

Although the present invention has been described with preferred embodiments, it is to be understood that modifications and variations be resulted to without departing from the spirit and scope of this invention, as those skilled in the art will readily understand. Such modifications and variations are considered to be within the purview and scope of the appended claims.

We claim:

1. A process for the selective removal of hydrogen sulfide from a gaseous stream, additionally containing carbon dioxide, by contacting the gaseous stream with a polyvalent metal chelate solution, wherein the pH of said polyvalent metal chelate solution is greater than 7 and is constant because the net absorption-desorption of said carbon dioxide in said solution is zero, said contacting being for a time sufficient to allow the polyvalent metal chelate solution to oxidize the hydrogen sulfide to elemental sulfur precipitate.

2. The process of claim 1, wherein said gaseous stream is contacted with said solution in a static mixer and said hydrogen sulfide is oxidized to sulfur in said static mixer.

3. The process of claim 1, wherein the polyvalent metal is iron.

4. The process of claim 1, wherein the chelate is ethylenediaminetetraacetic acid.

5. The process of claim 1, wherein the chelate is N-hydroxylethyl-ethylenediaminetriacetic acid.

6. The process of claim 1, wherein the contact time between the gaseous stream and the metal chelate is from about 0.006 to about 0.08 second.

7. The process of claim 1, wherein said solution contains carbonates, bicarbonates, hydroxide, or mixtures thereof.

8. The process of claim 1, wherein the polyvalent metal chelate solution has a pH between 7.5 and 11.

9. The process of claim 1, wherein at least 80% of the hydrogen sulfide in the gaseous stream is removed.

10. The process of claim 1, wherein after oxidizing the hydrogen sulfide, the polyvalent metal chelate is regenerated by passing an oxygen-containing gas through said solution.

11. The process of claim 10, wherein said oxygen-containing gas is air.

12. The process of claim 2, further comprising separating a gas phase of reduced hydrogen sulfide content from a liquid phase containing a reduced metal chelate solution having dispersed therein sulfur particles immediately after contact in said static mixer.

13. The process of claim 12, comprising regenerating said reduced metal chelate by passing an oxygen-containing gas through said liquid phase.

14. The process of claim 13, wherein said oxygen-containing gas is bubbled through said liquid phase, and said sulfur particles are carried to the surface of the liquid phase by said bubbles.

15. The process of claim 10, wherein said oxygen-containing gas is passed through said solution by forming a low pressure area below the surface of said solution and inducing said gas into said low pressure area to disperse said gas in said solution.

16. The process of claim 15, wherein said dispersed gas and said solution are subjected to a shearing force to intimately mix said gas in said solution and finely divide said gas into minute bubbles.

17. The process of claim 16, wherein said low pressure area is formed by movement of a rotating means below the surface of said solution and wherein said low pressure area communicates with a supply of said oxygen-containing gas.

18. The process of claim 17, wherein said supply of oxygen-containing gas is the atmosphere.

19. The process of claim 17, wherein a disperser means is provided below the surface of said solution, said disperser means surrounding and being circumferentially spaced from said rotating means, said gas and liquid being sheared by passing said dispersed gas and liquid through fluid openings in said disperser means.

20. The process of claim 1, wherein said gaseous stream contains a major proportion of carbon dioxide and a minor proportion of hydrogen sulfide.

21. The process of claim 20, wherein said gaseous stream comprises greater than 75% by weight carbon dioxide and less than 5% by weight hydrogen sulfide.

22. The process of claim 12, wherein said separating takes place in a separator means immediately following said static mixer, said static mixer and separator means forming a static mixer-separator train, said gaseous stream being fed to a plurality of first stage static mixer-separator trains.

23. The process of claim 22, wherein at least one additional static mixer-separator train follows each of said plurality of first stage static mixer-separator trains, said gas phase from said separator means being conveyed to the following static mixer in said additional static mixer-separator trains.

24. The process of claim 23, wherein said polyvalent metal chelate solution is fed to the static mixers of said plurality of first stage static mixer-separator trains and to the static mixers of said additional static mixer-separator trains.

25. The process of claim 23, wherein the liquid phase from each of said separators from the plurality of first stage static mixer-separator trains and the separators from said additional static mixer-separator trains is conveyed to a regenerator, said reduced metal chelate being oxidized by passing an oxygen-containing gas through said liquid phase in said regenerator.

26. The process of claim 25, wherein said oxygen-containing gas is bubbled through said liquid phase and said sulfur particles are carried to the surface of said liquid phase by said bubbles.

27. The process of claim 26, further comprising separating the sulfur particles from said liquid phase and melting the sulfur particles and separating said molten sulfur from any residual liquid phase.

28. The process of claim 10, further comprising adding an oxidizing adjunct selected from the group consisting of hydroquinones, anthraquinones, naphthaquinones, and mixtures thereof to said solution to increase the efficiency of regenerating the polyvalent metal chelate.

29. The process of claim 28, wherein said anthraquinone comprises 2–7 anthraquinone disulfonic acid disodium salt.

30. The process of claim 28, wherein said polyvalent metal chelate solution consists essentially of chelated iron, pH adjusting agents selected from the group consisting of carbonates, bicarbonates, hydroxides or mixtures thereof, and said oxidizing adjunct for increasing the regeneration of said chelated iron.

31. The process of claim 10, wherein said regenerated polyvalent metal chelate is recycled for contact with said gaseous stream.

32. The process of claim 31, wherein said recycled polyvalent metal chelate is devoid of oxygen.

33. The process of claim 31, wherein said polyvalent metal chelate comprises about 6% molar excess of chelate.

34. The process of claim 33, wherein said polyvalent metal is iron.

35. The process of claim 10, wherein said elemental sulfur is separated from said regenerated polyvalent metal chelate.

36. The process of claim 10, wherein an insufficient amount of oxygen-containing gas is passed through said polyvalent metal chelate solution to oxidize all of said solution.

37. A process for the selective removal of hydrogen sulfide from a gaseous stream, additionally containing carbon dioxide, comprising the step of contacting the gaseous stream with a polyvalent metal chelate solution having a pH value greater than 7, for a time from about 0.006 to about 0.08 seconds, wherein the pH of the polyvalent metal chelate solution is constant because the net absorption-desorption of the carbon dioxide in the solution is zero.

38. The process of claim 37, wherein the contact time is limited to a time sufficient to allow the polyvalent metal chelate to oxidize the hydrogen sulfide to elemental sulfur, but below that time allowing the metal chelate solution to absorb any carbon dioxide.

39. The process of claim 37, wherein the polyvalent metal is selected from the group consisting of iron, copper, manganese, or any combination thereof.

40. The process of claim 37, wherein the gaseous stream is contacted with the polyvalent metal chelate solution in the absence of oxygen.

41. The process of claim 37, wherein the polyvalent metal chelate solution has a pH between 7.5 and 11.

42. The process of claim 37, wherein the gaseous stream comprises greater than 75 wt % carbon dioxide and less than 5 wt % hydrogen sulfide.

43. The process of claim 37, further comprising the steps of:
(a) separating a gas phase of reduced hydrogen sulfide content from a liquid phase containing reduced metal chelate solution having dispersed therein elemental sulfur particles;
(b) passing a sufficient amount of an oxygen-containing gas through the liquid phase to simultaneously regenerate the reduced metal chelate and to separate the elemental sulfur particles from the chelate solution by flotation;
(c) recovering elemental sulfur particles; and
(d) recycling the regenerated metal chelate solution to be utilized in the initial step, wherein the gaseous stream is contacted with the polyvalent metal chelate solution.

44. The process of claim 43, wherein less than 100% regeneration of the metal chelate is obtained to insure the absence of oxygen in the area where the gaseous stream is contacted with the polyvalent metal chelate solution.

45. The process of claim 43, wherein the elemental sulfur recovered is substantially pure elemental sulfur.

46. A process for the selective removal of hydrogen sulfide from a gaseous stream additionally containing carbon dioxide, comprising the step of contacting the gaseous stream with a basic polyvalent metal chelate solution for a time sufficient to allow the polyvalent metal chelate to oxidize at least 80% of the hydrogen sulfide to elemental sulfur precipitate, wherein the pH of the polyvalent metal chelate solution is constant because the net absorption-desorption of the carbon dioxide in the solution is zero.

47. The process of claim 46, wherein the contact time is limited to a time sufficient to allow the polyvalent metal chelate to oxidize the hydrogen sulfide to elemental sulfur, but below that time allowing the metal chelate solution to absorb any carbon dioxide.

48. The process of claim 46, wherein the polyvalent metal is selected from the group consisting of iron, copper, manganese, or any combination thereof.

49. The process of claim 46, wherein the gaseous stream is contacted with the polyvalent metal chelate solution in the absence of oxygen.

50. The process of claim 46, wherein the contact time between the gaseous stream and the metal chelate is from about 0.006 to about 0.08 seconds, and wherein the polyvalent metal chelate solution has a pH between 7.5 and 11.

51. The process of claim 46, wherein the gaseous stream comprises greater than 75 wt % carbon dioxide and less than 5 wt % hydrogen sulfide.

52. The process of claim 46, further comprising the steps of:
(a) separating a gas phase of reduced hydrogen sulfide content from a liquid phase containing reduced metal chelate solution having dispersed therein elemental sulfur particles;
(b) passing a sufficient amount of an oxygen-containing gas through the liquid phase to simultaneously regenerate the reduced metal chelate and to separate the elemental sulfur particles from the chelate solution by flotation;
(c) recovering the separated elemental sulfur particles; and
(d) recycling the regenerated metal chelate solution to be utilized in the initial step of contacting the gaseous stream with the polyvalent metal chelate solution.

53. The process of claim 52, wherein less than 100% regeneration of the reduced metal chelate is achieved to insure the absence of oxygen in the area where the gaseous stream is contacted with the polyvalent metal chelate.

54. The process of claim 52, wherein the recovered elemental sulfur particles are substantially pure elemental sulfur.

55. A process for the continuous removal of hydrogen sulfide from a gaseous stream additionally containing carbon dioxide, comprising the steps of:
(a) contacting the gaseous stream with a polyvalent metal chelate solution having a pH value between 7.5 and 11, wherein the contact time is sufficient to allow the polyvalent metal chelate to oxidize the hydrogen sulfide to elemental sulfur precipitate, and wherein the pH of said polyvalent metal chelate solution is constant because the net absorption-desorption of said carbon dioxide in said solution is zero;
(b) separating a gas phase of reduced hydrogen sulfide content from a liquid phase containing reduced metal chelate solution having dispersed therein elemental sulfur particles;
(c) passing a sufficient amount of an oxygen-containing gas through the liquid phase to simultaneously regenerate the reduced metal chelate and to separate the elemental sulfur particles from the chelate solution by flotation;
(d) recovering the separated elemental sulfur particles; and
(e) recycling the regenerated metal chelate solution to be utilized in step (a).

56. The process of claim 55, wherein the polyvalent metal is selected from the group consisting of iron, copper, manganese, or any combination thereof.

57. The process of claim 55, wherein the gaseous stream is contacted with the polyvalent metal chelate solution in the absence of oxygen.

58. The process of claim 55, wherein the contact time between the gaseous stream and the metal chelate is from about 0.006 to about 0.08 seconds.

59. The process of claim 55, wherein the gaseous stream comprises greater than 75 wt % carbon dioxide and less than 5 wt % hydrogen sulfide.

60. The process of claim 55, wherein less than 100% regeneration of the reduced metal chelate is achieved to insure the absence of oxygen in the area where the gaseous stream is contacted with the polyvalent metal chelate.

61. The process of claim 55, wherein the recovered elemental sulfur is substantially pure elemental sulfur.

* * * * *